United States Patent
Kucera et al.

(10) Patent No.: US 7,571,593 B2
(45) Date of Patent: Aug. 11, 2009

(54) BAGGING LAWN MOWER WITH SELECTIVE MULCH OR DISCHARGE OPTIONS

(75) Inventors: Jeffrey R. Kucera, Parma Heights, OH (US); Kenneth R. Smith, Medina, OH (US); Ewald Buchdrucker, Columbia Station, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 11/920,326

(22) PCT Filed: May 17, 2006

(86) PCT No.: PCT/US2006/019182

§ 371 (c)(1),
(2), (4) Date: Nov. 13, 2007

(87) PCT Pub. No.: WO2006/125053

PCT Pub. Date: Nov. 23, 2006

(65) Prior Publication Data

US 2008/0307762 A1    Dec. 18, 2008

Related U.S. Application Data

(60) Provisional application No. 60/681,730, filed on May 17, 2005.

(51) Int. Cl.
*A01D 43/06* (2006.01)
(52) U.S. Cl. .................................................. 56/202
(58) Field of Classification Search .................. 56/202, 56/14.7, 203, 206, 320.1, 320.2; 298/29, 298/30, 31, 33
See application file for complete search history.

(56) References Cited

U.S. PATENT DOCUMENTS

| 4,087,955 A | 5/1978 | Szymanis et al. |
| 4,244,164 A | 1/1981 | Szymanis et al. |

(Continued)

FOREIGN PATENT DOCUMENTS

| EP | 1364568 A | 11/2003 |
| WO | WO 03/065791 | 8/2003 |

*Primary Examiner*—Robert E Pezzuto
(74) *Attorney, Agent, or Firm*—Wegman, Hessler & Vanderburg

(57) ABSTRACT

A multi-use lawn mower capable of operating as a mulching, side-discharge, or a bagging mower. The lawn mower (10) includes; a mower deck (14) having an opening (58) therein forming a passageway through which grass clippings exit the cutting chamber during select modes of operation. The lawn mower also includes a grass-collecting hopper (40) removably mounted on the mower deck (14), the grass-collecting hopper (40) having a basket portion (42) for receiving grass clippings cut by the cutting blade (36) and a multi-station mounting portion (60) configured to interface with the opening (58) in the mower deck in a plurality of orientations. The mounting portion includes a mulching station (64) that configures the lawn mower to function as a mulching mower, a bagging station (66) that configures the lawn mower to function as a bagging mower, and a side-discharge station (68) that configures the lawn mower to function as a side-discharge mower. When the multi-station mounting portion mounts the grass-collecting hopper on the mower deck, a single one of the stations interfaces with the opening in the mower deck to configure the lawn mower for desired mode of operation.

19 Claims, 5 Drawing Sheets

U.S. PATENT DOCUMENTS

| | | | |
|---|---|---|---|
| 4,263,771 A * | 4/1981 | Iaboni et al. | 56/13.4 |
| 4,974,403 A * | 12/1990 | Fukui et al. | 56/202 |
| 5,133,176 A | 7/1992 | Baumann et al. | |
| 5,205,112 A | 4/1993 | Tillotson et al. | |
| 5,212,938 A | 5/1993 | Zenner et al. | |
| 5,251,429 A | 10/1993 | Minato et al. | |
| 5,628,171 A | 5/1997 | Stewart et al. | |
| 5,791,130 A * | 8/1998 | Borling et al. | 56/202 |
| 6,425,231 B1 | 7/2002 | Yilmaz | |
| 6,705,068 B2 * | 3/2004 | Iida et al. | 56/202 |
| 6,751,937 B2 | 6/2004 | Kobayashi et al. | |
| 6,843,048 B2 | 1/2005 | Osborne | |
| 7,024,847 B2 | 4/2006 | Hartley | |
| 7,055,301 B2 | 6/2006 | Osborne et al. | |

\* cited by examiner

BAGGING LAWN MOWER WITH SELECTIVE MULCH OR DISCHARGE OPTIONS

CROSS-REFERENCE TO RELATED APPLICATION

This application claims the priority benefit of U.S. Provisional Patent Application Ser. No. 60/681,730 filed May 17, 2005.

BACKGROUND OF THE INVENTION

1. Field of Invention

This invention relates to mowing machines, and more specifically, to a lawn mower that can selectively function as a bagging mower, a mulching mower and a discharge mower.

2. Description of Related Art

Lawn mowers for cutting grass, weeds and leaves with a rotating cutting blade housed in a downward-opening mower deck are well known in the art. Generally, lawn mowers are classified in one of three classes, specifically: (1) bagging mowers that collect the grass cut by the cutting blade in a grass receptacle such as a hopper or bag; (2) side-discharge mowers that discharge the cut grass through an opening in the side of the mower deck in order to leave the grass clippings on the lawn; and (3) mulching mowers that that chop the grass clippings more finely within the cutting chamber formed by the mower deck and discharge the clippings downward of the deck.

Bagging-type lawn mowers collect grass clippings in the grass receptacle in order to remove all of the clippings from the lawn, thereby providing a professional quality appearance. However, the grass clippings collected in the grass receptacle must be carried to and dumped at a disposal site. The side-discharge and mulching-mode lawn mowers eliminate the need for dumping the grass clippings by returning grass clippings to the lawn. Mulching mowers chop the grass clippings into finer pieces so that they decompose more rapidly and give the lawn a good finished quality. However, if the grass is exceptionally tall or thick, mulching mowers tend to bog down with the excess grass clippings, leaving unsightly clumps and causing the mower to frequently stall. In such situations, discharging the grass clippings through a discharge chute in the mower deck as found on a side-discharge mower is the preferred option. It is commonly the case that a lawn caretaker may desire to use each of these different modes at different times, even on the same plot of grass.

In recent years, lawn mowers have been developed that can be selectively configured to operate in more than just a single mode of operation, e.g., the mower may be configured to operate as a mulching mower and a bagging mower, or even as a mulching mower, a side-discharge mower and a bagging mower. It is, however, inconvenient to reconfigure these lawn mowers between the different operational modes. Converting the lawn mower to a different operational mode typically involves the manual installation and/or removal of parts to the lawn mower requiring time consuming work. For example, mulching operations typically require the installation of a discharge cover or plug which a user must install in the discharge opening of the mower deck. If the user wants to switch back to the bagging mode of operation, the user must remove the mulch plug and reinstall the grass-collecting hopper. Tools are typically required to install or remove the mulching plug. The awkward, inconvenient and relatively time consuming process of installing and uninstalling the discharge plug also requires the installer to reach into the discharge opening with his/her hand, which can be difficult and messy. Additionally, the components not being used in the selected mode of operation, such as the mulch plug or the grass collection receptacle, must be stored separate from the lawn mower. Often, these parts become lost or misplaced or are otherwise not readily available when needed.

Therefore, there is a need for an improved lawn mower that can be easily reconfigured between a bagging mode, a mulching mode and a discharge mode by simple operation.

SUMMARY OF THE INVENTION

One aspect of the invention is a multi-use lawn mower that can be configured to operate in either a mulching mode, a discharge mode, or a bagging mode of operation, wherein the selection of the mode of operation is performed without the need to remove or add additional components to the lawn mower. The lawn mower includes a power source, a pair of front ground engaging wheels, a pair of rear ground engaging wheels, and a cutting blade connected to the power source. The lawn mower also includes a mower deck having a top panel surrounded by a downward extending skirt forming a cutting chamber in the underside the mower deck. The cutting chamber houses the cutting blade. The mower deck has an opening therein forming a passageway through which grass clippings exit the cutting chamber during select modes of operation. The lawn mower also includes a grass-collecting hopper removably mounted on the mower deck, the grass-collecting hopper having a basket portion for receiving grass clippings cut by the cutting blade and a multi-station mounting portion configured to interface with the opening in the mower deck in a number of different orientations. The mounting portion includes a mulching station that configures the lawn mower to operate in a mulching mode, a bagging station that configures the lawn mower to operate in a bagging mode, and a discharge station that configures the lawn mower to operate in a discharge mode. When the grass-collecting hopper is mounted on the mower deck, one of the stations interfaces with the opening in the mower deck to configure the lawn mower for the desired mode of operation.

Another aspect of the invention is a multi-use lawn mower capable of selectively bagging grass clippings or returning the grass clippings on the lawn. The lawn mower includes a power source, a cutting blade connected to the power source, and a mower deck forming a cutting chamber in the underside the mower deck. The cutting chamber houses the cutting blade. The mower deck has an opening therein forming a passageway through which grass clippings exit the cutting chamber during select modes of operation. The lawn mower also includes a grass-collecting hopper removably mounted on the mower deck. The grass-collecting hopper has a basket portion for receiving grass clippings cut by the cutting blade and a multi-station mounting portion configured to interface with the opening in the mower deck in a plurality of orientations. The mounting portion includes a bagging station that configures the lawn mower to operate in a bagging mode, and at least one other station that configures the lawn mower to operate in a mode that returns the grass clippings to the lawn. When the grass-collecting hopper is mounted on the mower deck, one of the plurality of stations interfaces with the opening in the mower deck to configure the lawn mower for the desired mode of operation.

In another aspect, the invention is directed to a multi-use lawn mower capable of selectively operating in a mulching mode of operation, a side-discharge mode of operation, or a bagging mode of operation. The lawn mower includes a power source, a pair of front ground engaging wheels, a pair of rear ground engaging wheels, and a cutting blade connected to the power source. The lawn mower further includes a mower deck that forms a cutting chamber in the underside the mower deck, the cutting chamber housing the cutting blade. The mower deck has an opening therein that forms a passageway through which grass clippings exit the cutting chamber during select modes of operation. The lawn mower also includes a grass-collecting hopper removably mounted above and generally over the center of the mower deck such that substantially the entire hopper is positioned between the front and rear ground engaging wheels. The grass-collecting hopper has a basket portion for receiving grass clippings cut by the cutting blade and a multi-station mounting portion configured to interface with the opening in the mower deck in a plurality of orientations. The basket portion and mounting portion are molded together and components that comprise the different stations of the mounting portion are molded into the mounting portion so that the grass-collecting hopper is a single unitary part. The mounting portion includes a mulching station that configures the lawn mower to function as a mulching mower, a bagging station that configures the lawn mower to function as a bagging mower, and a side-discharge station that configures the lawn mower to function as a side-discharge mower. When the multi-station mounting portion mounts the grass-collecting hopper on the mower deck, a single one of the stations interfaces with the opening in the mower deck to configure the lawn mower for the selected mode of operation.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
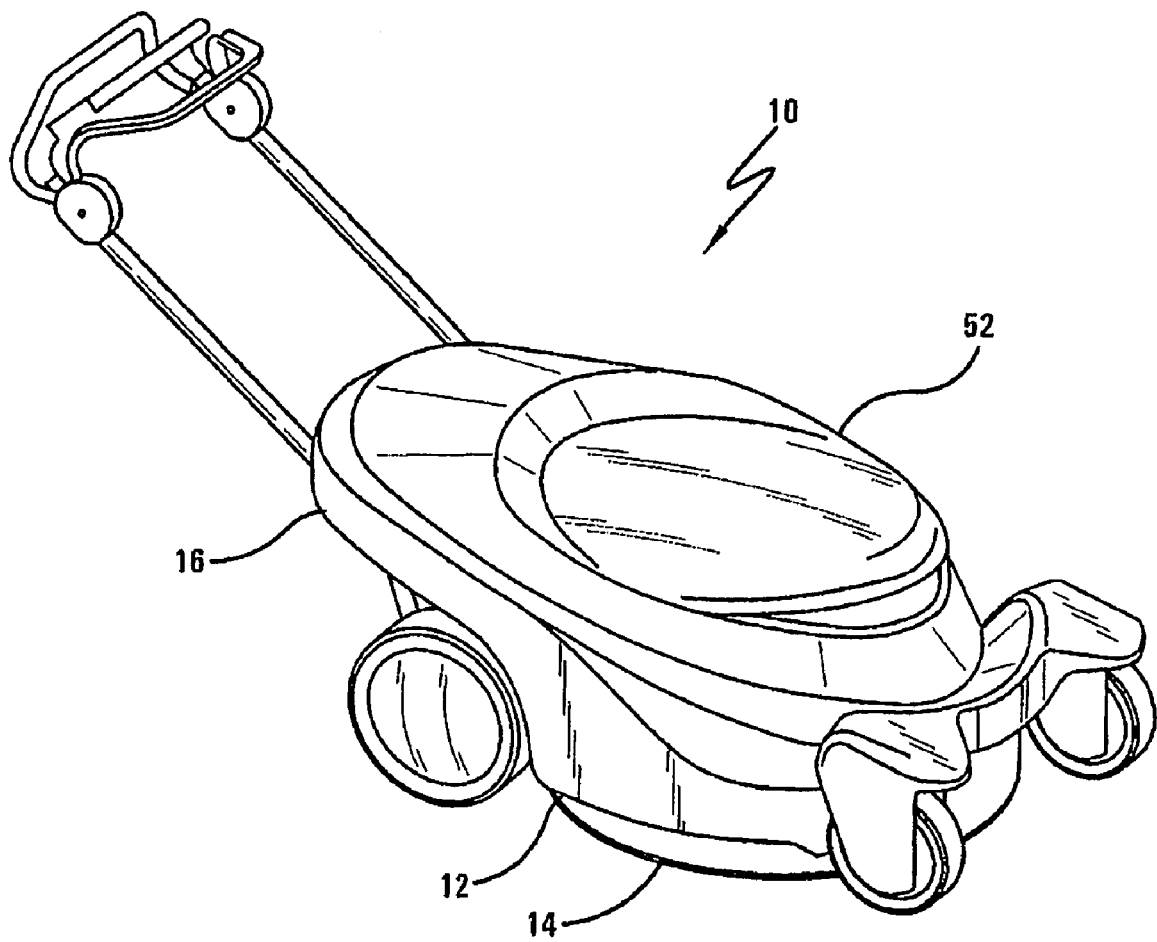
FIG. 1 is perspective view of a lawn mower according to one embodiment of the invention.
Figure 2:
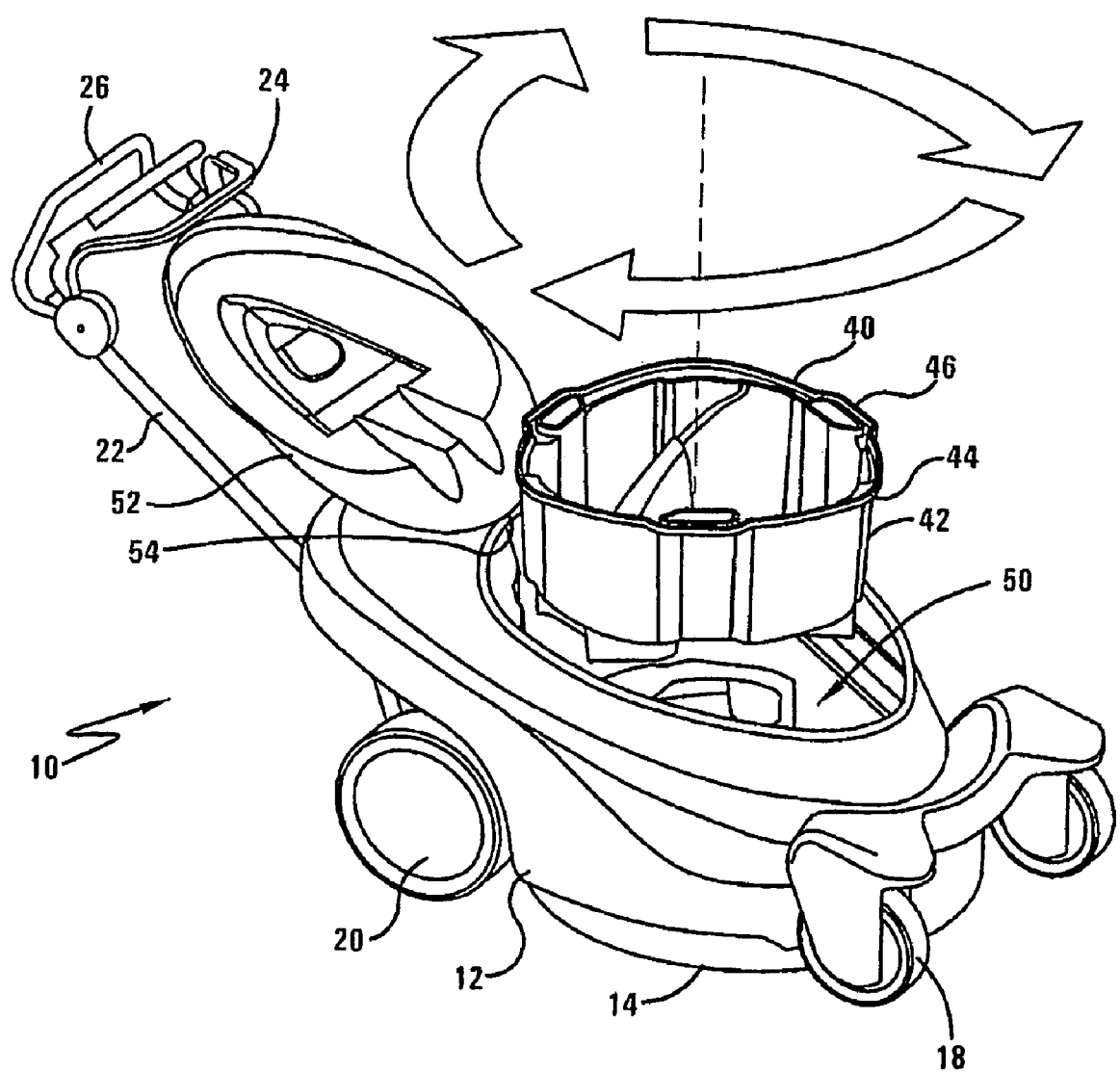
FIG. 2 is a partially exploded perspective view of the lawn mower of FIG. 1 illustrating a grass-collecting hopper.

Referring now to the Figures, one embodiment of a lawn mower according to the invention is shown generally at 10 in FIGS. 1 and 2. The lawn mower 10 has mower body 12 comprising a mower deck 14 at least partially covered by a housing 16. Front ground engaging wheels 18 are provided at the front of the mower body 12 and rear ground engaging wheels 20 are provided at the rear of the mower body 12. Desirably, the rear wheels 20 constitute drive wheels for the lawn mower 10, although the front wheels 18 may also be used as the drive wheels or the lawn mower may be manually propelled without departing from the scope of the invention. A handle 22 extends rearward from the mower body 12 to permit an operator to maneuver the lawn mower 10. The handle 22 has a conventional operator presence bail 24 and a speed control rod 26 as is known in the art. Although the invention is described herein as part of a walk-behind mower, one skilled in the art will understand that the invention may also be used on a riding lawnmower without departing from the scope of the invention.

Figure 3:
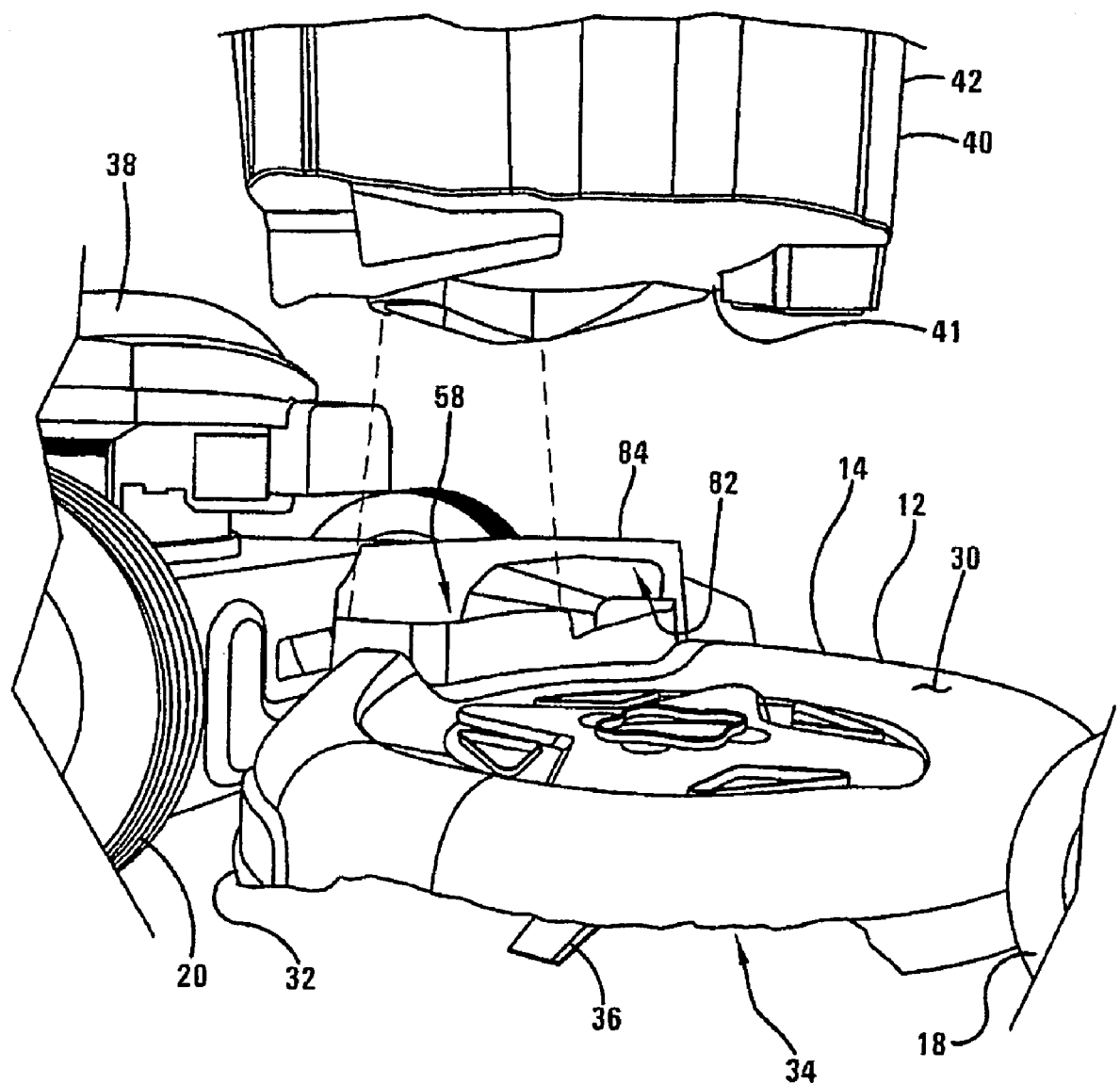
FIG. 3 is a partially exploded and cutaway perspective view of the mower deck and grass-collecting hopper of the lawnmower FIG. 1.

As best seen in FIG. 3, in one embodiment the mower deck 14 is fabricated with a generally horizontal top panel 30 surrounded by a downward extending skirt 32 to form a cutting chamber 34 in the underside the mower deck 14. However, other shapes for the mower deck can be selected using sound engineering judgment provided the mower deck forms a suitable cutting chamber. As is understood in the art, a grass cutting blade 36 is provided in the cutting chamber 34 of the mower deck 14. A power source, such as a gasoline powered engine 38 is mounted on the mower body 12 for rotating the cutting blade 36 and desirably driving the rear wheels 20. However, it is understood that the power source 38 may be an electric motor without departing from the scope of the invention. The power source 38 has an output shaft (not shown) that is operatively connected to the drive wheels and the cutting blade 36 through transmission means well understood in the art. Therefore, further description of the transmission means need not be provided herein.

Figure 4:
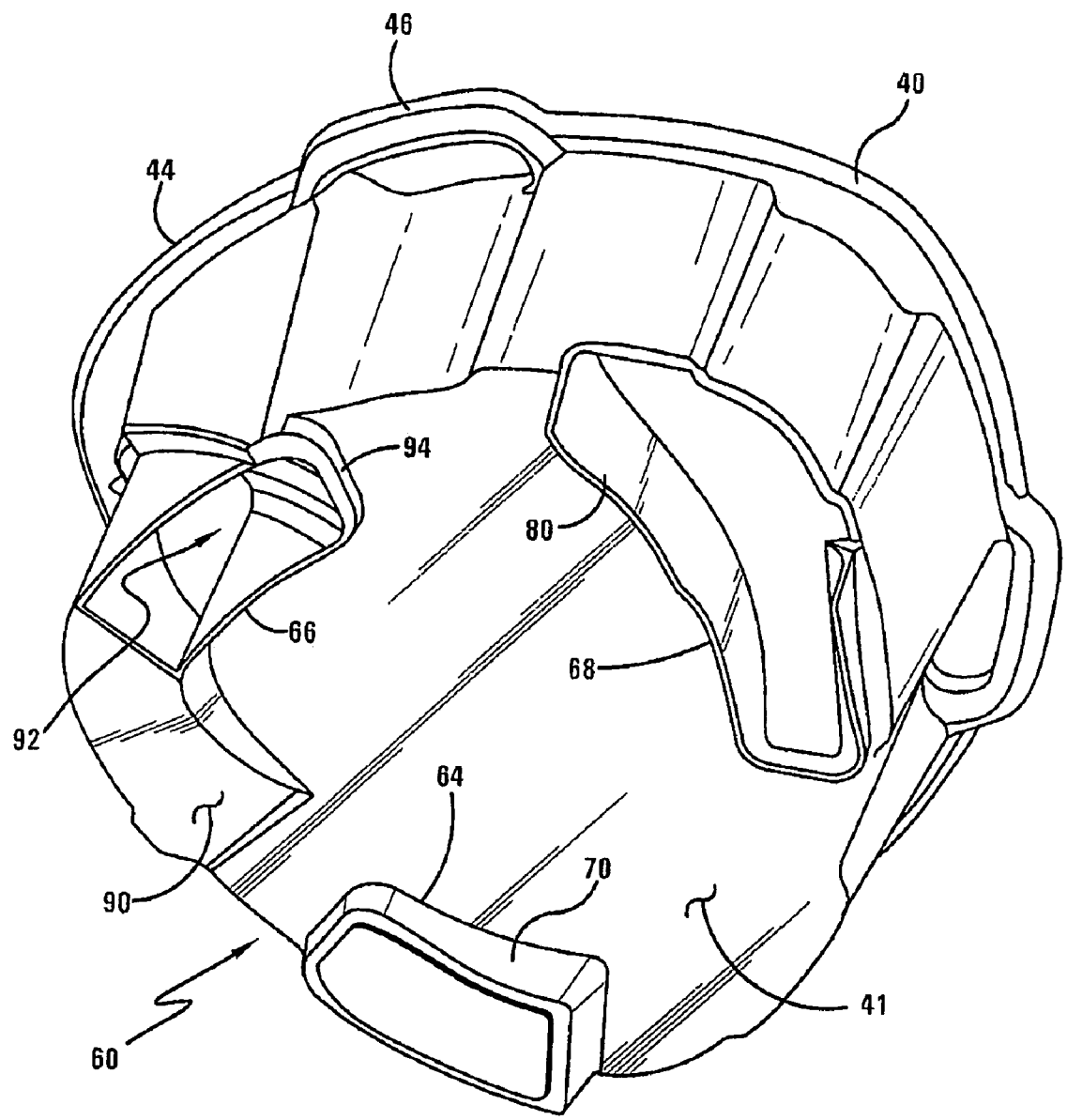
FIG. 4 is a bottom perspective view of a mounting portion of the grass-collecting hopper of FIG. 2.

A grass-collecting hopper 40 is removably mounted on the mower deck 14. The grass-collecting hopper 40 comprises a bottom portion 41 and a basket portion 42 configured to receive and hold the grass clippings. Referring also now to FIG. 4, the basket portion 42 has an upper rim 44 containing a plurality of lift handles 46 molded therein for lifting and carrying the hopper 40. The basket portion 42 desirably contains mesh openings (not shown) to aid with air flow out of the basket portion 42 so that the grass clippings can be effectively deposited in the hopper 40. In one embodiment, the grass-collecting hopper 40 is molded as a single integral piece of polypropylene such that the hopper is somewhat stiff so that it retains it shape to aid in placement onto the mower deck 14 when empty. However, it is noted that other like materials that enable the manufacture of a long-lasting, durable part may be used. It is further to be understood that the grass-collecting hopper 40 may comprise several different components that are glued, snapped or welded together or otherwise fastened together with screws, rivets or other fasteners without departing from the scope of the invention.

As best seen in FIG. 2, the housing 16 defines a cavity 50 configured to receive the grass-collecting hopper 40 so that the hopper can mount above the top panel 30 of the mower deck 14. In the embodiment illustrated, the grass-collecting hopper 40 is mounted above and generally over the center of the mower deck 14 such that substantially all of the grass-collecting hopper 40 is positioned between the front and rear wheels 18, 20 when in its operational position. While the position of the hopper 40 in the illustrated embodiment is desirable, one skilled in the art will understand that other embodiments are contemplated that may position the hopper 40 in other locations on the mower body 12 such that a substantial portion of the hopper is behind the rear wheels 20 or to the side of the mower deck 14 without departing from the scope of the invention.

The housing 16 contains a flap 52 that covers the grass-collecting hopper 40 when it is mounted in the cavity 50. Desirably, the flap 52 is attached to the housing 16 with a hinge 54 so that the flap 52 can be pivoted to enable access to the grass-collecting hopper 40 for easy insertion and removal of the hopper into and out of the cavity 50. Thus, with the flap 52 in the open position, the user can lift the grass-collecting hopper 40 out of the cavity 50 and carry the hopper to a suitable grass disposal location to dump and dispose of the grass clippings collected in the hopper. Alternately, the flap 52 may be made part of the grass-collecting hopper 40 without departing from the scope of the invention. In the illustrated embodiment, the mower deck 14 has a circumferential ridge 56 extending generally around the outer circumference of the top panel 30. The ridge 56 engages the grass-collecting hopper 40 to secure the hopper in the cavity 50.

As best seen in FIG. 3, an opening 58 is formed in the mower deck 14 to permit grass clippings cut by the cutting blade 36 to exit the cutting chamber 34. Desirably, the opening 58 is in the top panel 30 of the mower deck 14 and is located to the rear and toward one side of the deck as illustrated in FIG. 3. However, the opening 58 may be located in other positions in the mower deck 14 using sound engineering judgment without departing from the scope of the invention. According to the invention, the grass-collecting hopper 40 selectively interfaces with the opening 58 in the mower deck 14 to determine the mode of operation of the lawn mower 10 as will now be discussed.

Turning now to FIG. 4, a mounting portion 60 of the grass-collecting hopper 40 comprises a plurality of stations configured to interface with the mower deck 14 of the lawn mower 10. In one embodiment, the mounting portion 60 is the bottom portion 41 of the grass-collecting hopper 40 and comprises three separate stations. The three stations will be described below as a mulching station 64, a bagging station 66 and a discharge station 68, because when the particular station interfaces with the opening 58 in the mower deck 14, the designated station (64, 66 or 68) causes the lawn mower 10 to operate as a mulching mower, a bagging mower and a side-discharge mower, respectively. Desirably, the mounting portion 60 contains the three stations illustrated in FIG. 4. However, one skilled in the art will understand that the mounting portion 60 may contain only two stations without departing from the scope of the invention. In such embodiment, it is preferable that the mounting portion 60 have a bagging station and a station that returns the grass clippings to the lawn, such as either a mulching station or a discharge station. Desirably, the components comprising the stations 64, 66, 68 are molded into the mounting portion 60 such that the grass-collecting hopper 40 is made as a single unitary part. However, the components comprising the stations 64, 66, 68 may be glued, welded, attached with fasteners or otherwise affixed to the hopper 40 without departing from the scope of the invention.

To aid in the convenience of using the lawn mower 10, it is desirable that the grass-collecting hopper 40 be the only component necessary to configure the lawn mower 10 for the particular mode of operation desired. Therefore, it is not necessary to install or remove additional components from the lawn mower in order to reconfigure the mower 10 between the bagging, discharge and mulching operational modes. In the illustrated embodiment, the grass-collecting hopper 40 has a generally triangular layout with each station 64, 66, 68 forming one corner of the triangle so that the stations are spaced about 120 degrees apart around the circumference of the bottom portion 41 of the hopper 40. To select the mode of operation, the operator simply positions the grass-collecting hopper 40 such that the desired station (64, 66 or 68) interfaces with the opening 58 in the mower deck 14. To switch modes of operation, the operator simply needs to remove the grass-collecting hopper 40 and reposition it (as illustrated by the arrows in FIG. 2) so that the station (64, 66 or 68) corresponding to the desired mode of operation interfaces with the opening 58 in the mower deck 14.

Figure 5A:
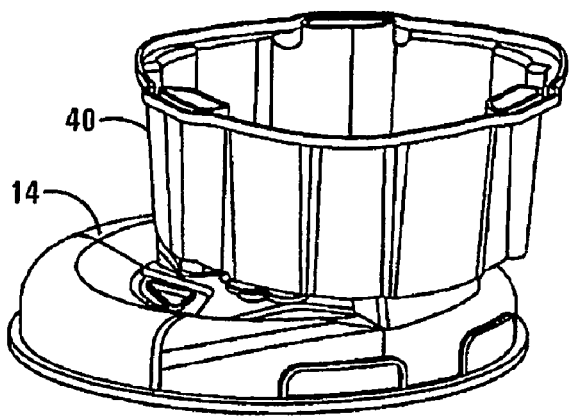
FIG. 5A is an enlarged perspective view of a mulching station on the grass-collecting hopper of FIG. 4.
Figure 5B:
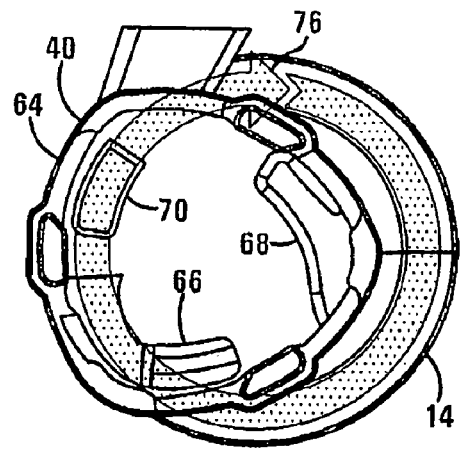
FIG. 5B is a view of the grass-collecting hopper and mower deck illustrating the flow of grass clippings when the mower is in a mulching mode of operation.

As illustrated in FIGS. 4, 5A and 5B, the mulching station 64 comprises a plug 70 extending downward from the bottom portion 41 of the grass-collecting hopper 40. The plug 70 has a shape corresponding to the shape of the opening 58 in the mower deck 14, and when the grass-collecting hopper 40 is mounted on the mower deck 14 such that the plug 70 interfaces with the opening 58, the plug 70 substantially fills the opening 58 such that grass clippings are prevented from passing through the opening 58. Thus, the plug 70 substantially seals the opening 58 causing the grass clippings to remain in the cutting chamber 34 as illustrated by the pathway 76 in FIG. 5B so that the cuttings are repeatedly chopped into smaller clippings as in a conventional mulching mower.

Figure 6A:
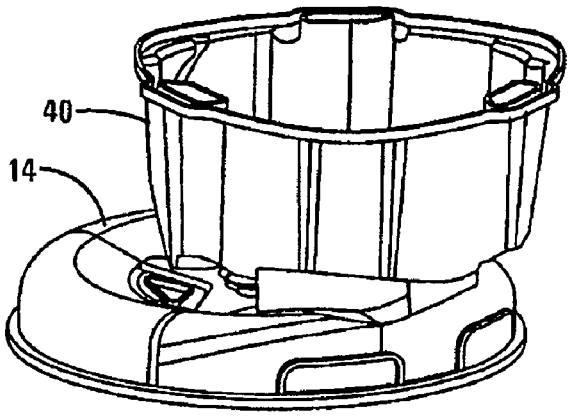
FIG. 6A is an enlarged perspective view of a discharge station on the grass-collecting hopper of FIG. 4.
Figure 6B:
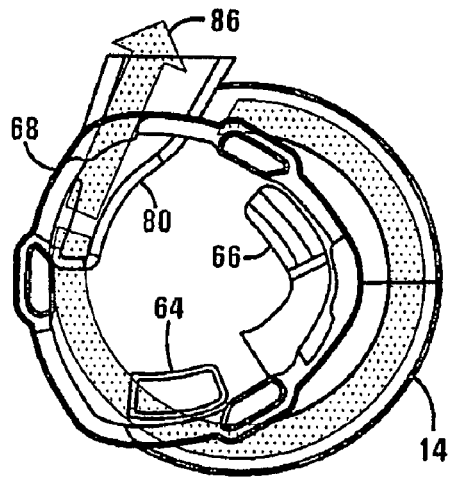
FIG. 6B is a view of the grass-collecting hopper and mower deck illustrating the flow of grass clippings when the mower is in a discharge mode of operation.

As best seen in FIGS. 4, 6A and 6B, the discharge station 68 comprises a skirt 80 extending from the bottom portion of the hopper that engages the opening 58 in the mower deck 14 such that at least a portion of the skirt is received about the outer circumference of the opening. The skirt 80 directs the grass clippings so that they pass out of the cutting chamber 34 through the opening 58 in the mower deck 14 and through a discharge passageway 82 formed by a chute 84 (FIG. 3) mounted on the mower deck 14 such that they are discharged outwardly on the ground to the side of the lawn mower 10 as illustrated by the pathway 86 in FIG. 6B. As best seen in FIGS. 3 and 4, the skirt 80 forms a wall having the general shape of the opening 58 with the side adjacent the chute 84 being left open so that grass clippings are free to pass through the chute.

Figure 7A:
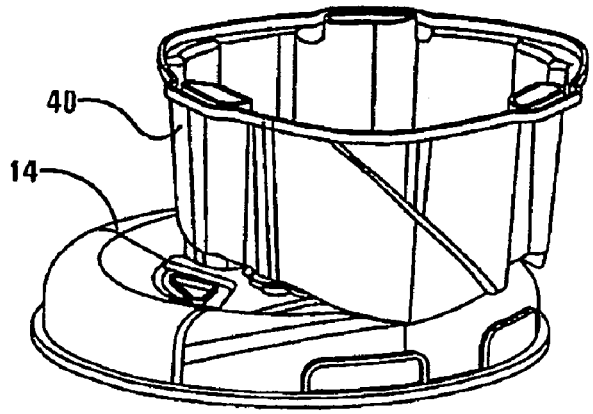
FIG. 7A is an enlarged perspective view of a bagging station on the grass-collecting hopper of FIG. 4.
Figure 7B:
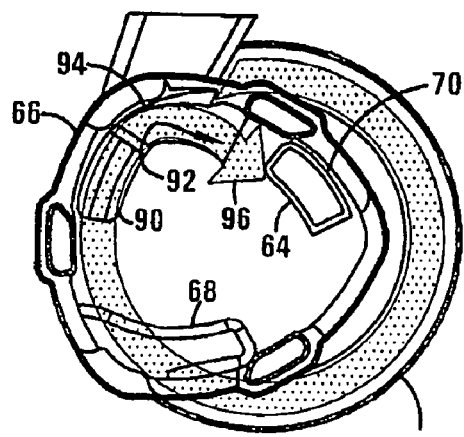
FIG. 7B is a view of the grass-collecting hopper and mower deck illustrating the flow of grass clippings when the mower is in a bagging mode of operation.

As best seen in FIGS. 4, 7A and 7B, the bagging station 66 comprises a ramp 90 leading to an aperture 92 in the bottom portion 41 of the grass-collecting hopper 40. An end wall 94 effectively blocks the chute 84 to prevent the grass clippings from being discharged to the side of the mower 10. The ramp 90 guides the grass clippings from the opening 58 in the mower deck 14 through the aperture 92 in the bottom portion 41 and up into the grass-collecting hopper 40 so that the clippings are collected in the hopper 40. Thus, when the grass-collecting hopper 40 is mounted such that the bagging station 66 interfaces with the opening 58 in the mower deck 14, the grass cut by the cutting blade 36 is received and collected in the basket portion 42 of the hopper 40 as illustrated by the pathway 96 illustrated in FIG. 7B. Desirably, the ramp 90 extends into the basket portion 42 of the hopper 40 to maintain a pathway for the grass clippings as they enter the basket portion so that they do not fall and clump near the aperture 92 and impede the collection of additional grass clippings at least until the basket is substantially full.

As briefly set forth above, the plug 70, skirt 80 and ramp 90 are desirably molded as part of the bottom portion 41 of the hopper 40. Therefore, when the operator desires to select a certain mode of operation for the lawn mower 10, the operator simply positions the grass-collecting hopper 40 so that the station 64, 66, 68 corresponding to the desired mode of operation interfaces with the opening 58 in the mower deck 14. Suitable markings (not shown) can be placed on the upper rim 44 of the grass-collecting hopper 40 to visually aid the operator in correctly positioning the hopper 40 in the proper orientation. Accordingly, the operator does not need to add or remove any components to the lawn mower 10 in order to change modes of operations, but must only re-position the grass-collecting hopper 40 to the selected position. Desirably, each station 64, 66, 68 has a shape corresponding to the opening 58 in the mower deck 14 such that when correctly positioned in the cavity 50, the hopper 40 snaps or locks in place to help securely mount and discourage misplacement of the hopper. Additionally, as best seen in FIG. 3, the top panel 30 of the mower deck 14 may have features that receive the stations (64, 66, 68) not engaged with the opening 58 to aid in securely affixing the hopper 40 to the mower deck. Additionally, the stations 64, 66, 68 permit a gap between the central surface of the bottom portion 41 of the hopper 40 and the mower deck 14 so that suitable connecting means (not shown) can connect the cutting blade 36 with the power source 38.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A multi-use lawn mower configured to selectively bag grass clippings or return the grass clippings to the lawn, the lawn mower comprising:
    a pair of front ground engaging wheels;
    a pair of rear ground engaging wheels;
    a power source;
    a cutting blade connected to said power source;
    a mower deck forming a cutting chamber in the underside the mower deck, the cutting chamber housing the cutting blade, wherein the mower deck has an opening therein through which grass clippings exit the cutting chamber during select modes of operation; and
    a grass-collecting hopper removably mounted on the mower deck, said grass-collecting hopper having a basket portion for receiving grass clippings cut by said cutting blade and a mounting portion having a plurality of stations such that the mounting portion is configured to interface with the opening in more than one different orientation, said mounting portion comprising a bagging station that configures the lawn mower to operate in a bagging mode and at least one other station that configures the lawn mower to operate in a mode in which grass clippings are returned to the lawn, wherein when the multi-station mounting portion mounts the grass-collecting hopper on the mower deck, one of said plurality of stations interfaces with the opening in the mower deck to configure the lawn mower to operate in the selected mode of operation, wherein the grass-collecting hopper is mounted above and generally over the center of the mower deck such that the hopper is positioned between the front and rear ground engaging wheels.

2. The lawn mower according to claim 1, wherein the mower deck comprises a top panel surrounded by a downward extending skirt and the mounting portion comprises the bottom portion of the grass-collecting hopper, wherein each station has a component with a shape corresponding to the shape of the opening in the mower deck such that the hopper is received by the mower deck in one of a plurality of orientations to select the mode of operation such that the selection of the mode of operation of the lawn mower is performed by positioning the hopper without removing or adding additional components to the lawn mower.

3. The lawn mower according to claim 1 wherein the bagging station comprises a ramp leading to an aperture in the bottom portion of the grass-collecting hopper, wherein the ramp guides the grass clippings from the opening in the mower deck through the aperture in the grass-collecting hopper such that the grass cut by the cutting blade is received and collected in the basket portion of the hopper.

4. The lawn mower according to claim 1 wherein the mounting portion comprises a mulching station having a plug extending downward from the bottom portion of the grass-collecting hopper, the plug having a shape corresponding to the shape of the opening in the mower deck, and when the grass-collecting hopper is mounted on the mower deck such that the mulching station interfaces with the opening, the plug substantially fills the opening such that grass clippings are prevented from passing through the opening so that the mower operates in a mulching mode.

5. The lawn mower according to claim 1 wherein the mounting portion comprises a discharge station having a skirt extending from the bottom portion of the hopper that engages the opening in the mower deck such that the skirt directs the grass clippings out of the cutting chamber through a discharge passageway formed by a chute mounted on the mower deck such that the clippings are discharged on the ground to the side of the lawn mower in a discharge mode.

6. The lawn mower according to claim 1 wherein the mounting portion comprises both a mulching station and a discharge station so that the mower selectively operates in either a bagging mode, a mulching mode or a discharge mode, the mulching station having a plug extending downward from the bottom portion of the grass-collecting hopper, the plug having a shape corresponding to the shape of the opening in the mower deck, and when the grass-collecting hopper is mounted on the mower deck such that the mulching station interfaces with the opening, the plug substantially fills the opening such that grass clippings are prevented from passing through the opening and the side-discharge station having a skirt extending from the bottom portion of the hopper that engages the opening in the mower deck such that the skirt directs the grass clippings out of the cutting chamber through a discharge passageway formed by a chute mounted on the mower deck such that the clippings are discharged on the ground to the side of the lawn mower.

7. The lawn mower according to claim 6 wherein the grass-collecting hopper has a generally triangular layout, with each station forms one portion of the triangle so that the stations are spaced about 120 degrees apart around the bottom portion of the hopper.

8. The lawn mower according to claim 6, wherein the components of the mounting portion comprising the plurality of stations are molded into the grass-collecting hopper so that the basket portion and mounting portion are made as a single unitary part, and further comprising an upper rim containing a plurality of lift handles molded therein for lifting and carrying the hopper.

9. The lawn mower according to claim 6 wherein the housing contains a hinged flap configured to cover the grass-collecting hopper when the hopper is mounted on the mower deck.

10. A multi-use lawn mower configurable for use as a mulching mower, a discharge mower and a bagging mower, the lawn mower comprising:
   a power source;
   a pair of front ground engaging wheels;
   a pair of rear ground engaging wheels;
   a cutting blade connected to said power source;
   a mower deck having a top panel surrounded by a downward extending skirt forming a cutting chamber in the underside the mower deck, the cutting chamber housing the cutting blade, wherein the mower deck has an opening therein forming a passageway through which grass clippings exit the cutting chamber during select modes of operation;
   a grass-collecting hopper removably mounted on the mower deck, said grass-collecting hopper having a basket portion for receiving grass clippings cut by said cutting blade and a multi-station mounting portion configured to interface with the opening in the mower deck in a plurality of orientations, wherein said mounting portion comprises:
      a mulching station that plugs the opening in the mower deck to configure the lawn mower to function as a mulching mower when said hopper is positioned in a first orientation;
      a bagging station that guides grass clippings into the basket portion of the hopper to configure the lawn mower to function as a bagging mower when said hopper is positioned in a second orientation; and
      a discharge station that directs grass clippings out of the cutting chamber through the opening to configure the lawn mower to function as a discharge mower when said hopper is positioned in a third orientation;
      wherein when the multi-station mounting portion mounts the grass-collecting hopper on the mower deck, one of said stations interfaces with the opening in the mower deck to configure the lawn mower for the desired mode of operation.

11. The lawn mower according to claim 10 wherein the grass-collecting hopper is mounted above and generally over the center of the mower deck such that the hopper is positioned between the front and rear ground engaging wheels.

12. The lawn mower according to claim 10 wherein the mounting portion comprises the bottom portion of the grass-collecting hopper.

13. The lawn mower according to claim 10 wherein the components of the mounting portion comprising the plurality of stations are molded into the grass-collecting hopper so that the basket portion and mounting portion are made as a single unitary part.

14. The lawn mower according to claim 10 wherein the grass-collecting hopper has a generally triangular layout, with each station forming one portion of the triangle such that the stations are spaced about 120 degrees apart around the circumference of the bottom portion of the hopper.

15. The lawn mower according to claim 10 wherein the mulching station comprises a plug extending downward from the bottom portion of the grass-collecting hopper, the plug having a shape corresponding to the shape of the opening in the mower deck, and when the grass-collecting hopper is mounted on the mower deck such that the mulching station interfaces with the opening, the plug substantially fills the opening such that grass clippings are prevented from passing through the opening.

16. The lawn mower according to claim 10 wherein the discharge station comprises a skirt extending from the bottom portion of the hopper that engages the opening in the mower deck such that the skirt directs the grass clippings out of the cutting chamber through a discharge passageway formed by a chute mounted on the mower deck such that the clippings are discharged on the ground to the side of the lawn mower.

17. The lawn mower according to claim 10 wherein the bagging station comprises a ramp leading to an aperture in the bottom portion of the grass-collecting hopper, wherein the ramp guides the grass clippings from the opening in the mower deck through the aperture in the grass-collecting hopper such that the grass cut by the cutting blade is received and collected in the basket portion of the hopper.

18. The lawn mower according to claim 10 wherein each station has a component with a shape corresponding to the shape of the opening in the mower deck such that the hopper is received by the mower deck in one of three orientations to select the mode of operation such that the selection of the mode of operation of the lawn mower is performed without removing or adding additional components to the lawn mower.

19. A multi-use lawn mower capable of selectively operating in a mulching mode of operation, a side-discharge mode of operation, or a bagging mode of operation, the lawn mower comprising:
   a power source;
   a pair of front ground engaging wheels;
   a pair of rear ground engaging wheels;
   a cutting blade connected to said power source;
   a mower deck forming a cutting chamber in the underside the mower deck, the cutting chamber housing the cutting blade, wherein the mower deck has an opening therein forming a passageway through which grass clippings exit the cutting chamber during select modes of operation;
   a grass-collecting hopper removably mounted above and generally over the center of the mower deck such that substantially all of the hopper is positioned between the front and rear ground engaging wheels, said grass-collecting hopper having a basket portion for receiving grass clippings cut by said cutting blade and a multi-station mounting portion configured to interface with the opening in the mower deck in a plurality of orientations, wherein components comprising the stations of the mounting portion are molded into the grass-collecting hopper so that the basket portion and mounting portion are made as a single unitary part, wherein said mounting portion comprises a mulching station that configures the lawn mower to function as a mulching mower, a bagging station that configures the lawn mower to function as a bagging mower, and a side-discharge station that configures the lawn mower to function as a side-discharge mower, wherein when the multi-station mounting portion mounts the grass-collecting hopper on the mower deck, a single one of said stations interfaces with the opening in the mower deck to configure the lawn mower for the desired mode of operation.

* * * * *